March 11, 1969

W. A. RAY 3,432,140

SOLENOID VALVE

Filed June 30, 1966

INVENTOR.
WILLIAM A. RAY
By Gordon H. Olson
ATTORNEY.

3,432,140
SOLENOID VALVE
William A. Ray, North Hollywood, Calif., assignor to International Telephone and Telegraph Corporation, New York, N.Y., a corporation of Delaware
Filed June 30, 1966, Ser. No. 562,157
U.S. Cl. 251—129
Int. Cl. F16k *1/46*, *31/04*
4 Claims

ABSTRACT OF THE DISCLOSURE

A power operated valve comprises a valve body having an inlet chamber, an outlet chamber and a movable valve element for selectively controlling a passage of fluid from said inlet chamber to said outlet chamber in a sealed cavity in the valve which includes an actuator rod for moving the valve element and power means for reciprocating the rod. Porous means are provided between the inlet chamber and the sealed cavity to permit fluid communication therebetween, while permitting the passage of fluid or viscous substances found in contaminated fluids.

---

This invention relates to power operated valves adapted to be used to control the flow of a fluid containing solid particles therein such as a contaminated fluid, and particularly to solenoid operated valves of this type.

In one type of widely employed solenoid valve, the tube or cylinder in which the solenoid plunger or actuator is reciprocated in use is in fluid communication with the interior of the valve and hence is externally sealed. Such an arrangement is generally preferable to that of attempting to seal the actuator rod or valve stem which extends through the body of the valve to be operatively connected with the solenoid plunger. Since the solenoid plunger is thus exposed to the liquid being metered by the valve it is essential that the fluid or liquid not interfere with the operation of the solenoid. There are, however, many liquids which are contaminated or of such nature as would interfere and possibly cause the solenoid to stick or to otherwise become inoperative. This is particularly a problem in connection with low force solenoids.

It is a primary object of this invention to provide an improved power operated valve structure for controlling the flow of a contaminated fluid.

It is a further object of this invention to provide a solenoid operated valve structure in which the solenoid plunger or piston is in liquid communication with the fluid passing through the valve with means for preventing contaminants in the liquid from interfering with the operation of the solenoid.

Briefly stated, the invention includes a valve body having a movable valve element therein, an actuator rod extending through the valve body for moving the valve element, and power means, such as a solenoid, mounted on the valve body for reciprocating the actuator rod. The solenoid includes a sealed cylindrical cavity into which the actuator rod extends in unsealed relation so that the interior of the valve is in fluid communication with the interior of the cylinder. Porous means such as a disc is positioned surrounding the rod at the connection between the valve body and the solenoid to prevent the passage of solid and viscuos substances into the cylinder while yet permitting fluid communication between the cylinder and the valves. Thus, the porous disc prevents contaminants from reaching the solenoid and interfering with its operation. The porous disc is to a large extent self cleaning in view of the liquid flow in both directions through the disc during operation.

Figure 1:
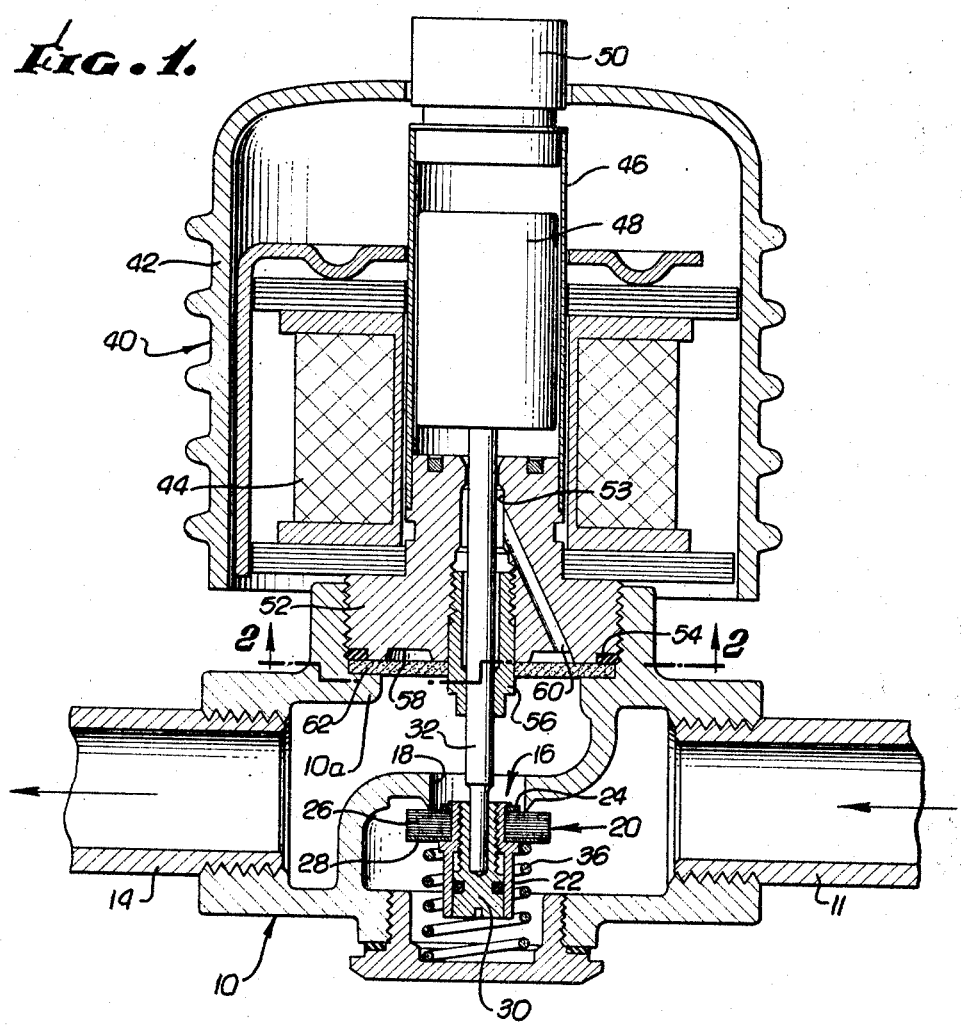
Figure 2:
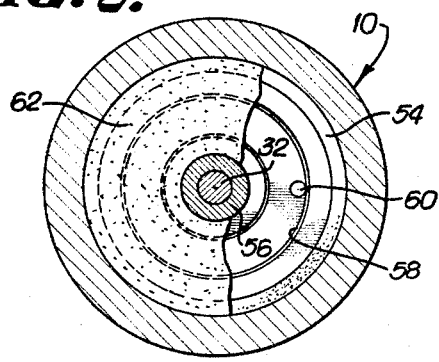

Further features, objects and attendant advantages will become apparent with reference to the following description and drawing, in which:

FIG. 1 is a cross-sectional elevational view of a solenoid valve structure embodying the invention; and FIG. 2 is a cross-sectional view on line 2—2 of FIG. 1.

In the drawing there is shown a valve body 10 having an inlet connection 11 and an outlet connection 14 with a main valve 16 positioned therebetween and including a fixed valve seat 18 and a movable valve assembly 20. The movable valve assembly 20 includes a tubular support member 22 carrying a retaining washer 24 engaging the upper surface of a resilient valve element 26 having its lower surface engaging backup washer 28. A socket member 30 is threadably received within tubular member 22 for receiving the lower end of an actuator rod or stem 32. A coil spring 36 engages the lower surface of washer 28 and the upper surface of access plug 38 to urge valve assembly 20 to a normally closed position.

To provide power for operating the valve, there is employed a solenoid structure 40 including a casing 42, electro-magnet structure 44 surrounding a thin wall tube or cylinder 46 which contains a plunger 48 made of magnetic material to be operated by the coil structure 44. A cap or plug 50 is welded or otherwise secured to the upper end of cylinder 46 while a base member 52 is similarly secured to the lower end of the cylinder. As can be seen from the drawing, the lower end of base member 52 extends into an aperture in valve body 10 and is threadably secured to the body. A gasket 54 prevents leakage between the base 52 and the valve body and hence the interior of the cylinder 46 and the valve body are sealed to prevent leakage.

The actuator rod 32 extends upwardly through a central opening 53 in tubular base member 52 to be operatively connected to plunger 48. The rod 32 may be an integral part of plunger 48 or it may be a separate element. The cylinder 46 is made of non-magnetic materials so as to minimize flux losses in the solenoid operation and it is preferably made of a strong material such as stainless steel to withstand the valve fluid pressure while maintaining the thin wall construction. A bushing 56 is threadably mounted in opening 53 in the lower portion of base member 52 to receive actuator rod 32. This bushing preferably has a machined internal diameter to minimize fluid leakage along the actuator rod 32 and to adequately guide rod 32.

An annular groove 58 is formed in the lower surface of base member 52 and is in liquid communication with a passage 60 which angles upwardly from the groove to an enlarged portion of the central opening 53 in base member 52 which is in fairly open fluid communication with the interior of cylinder 46.

It is desirable that the interior of cylinder 46 be in communication with the interior of the main valve chamber so that the movement of the plunger is not restricted by pressure caused by fluid displacement as the actuator rod moves. That is, if rod 32 is moved downwardly, for example, further into the valve body 10, the additional amount of rod inserted into the valve must displace a quantity of pressurized fluid. If no provision were made for this displacement, a low force solenoid would be unable to move the plunger. With the cylinder 46 in communication with the interior of the valve, the fluid displaced by the rod is forced upwardly through passage 60 into cylinder 46. Axial slots (not shown) or other means may be formed in plunger 48 to insure free fluid flow throughout cylinder 46.

With such arrangement, if the valve is used for controlling the flow of the contaminated fluid, or fluid which normally has a considerable quantity of solid particles therein, it is essential that foreign matter will not be introduced into the cylinder 46, that it will interfere with the movement of the plunger 48 making the solenoid inoperative. In accordance with the invention, in order to overcome this problem there is provided a rigid disc 62 made of porous material and clamped beneath the lower surface of base member 52 and an annular shoulder 10a of valve body 10. The nature of this material is such that it readily permits fluid flow, but prevents the flow of solid particles of a size that would interfere with the operation of the plunger. The porous disc can, of course, be constructed to fit the parameters of the particular application. That is, the porosity and thickness of the disc can be varied as desired to insure rapid fluid flow while restricting solid particles.

One of the features of the porous disc construction is that the disc is somewhat self-cleaning. As the solenoid is operated, fluid is first forced upwardly through the disc during the down stroke of the solenoid and then fluid is forced downwardly through the disc during the up stroke of the solenoid; and consequently, the contaminants which may have collected by the disc as the fluid was flowing upwardly through the disc is flushed away when the flow is reversed. Thus, with this simple but unique approach, the reliable operation of the solenoid in contaminated fluids is insured.

What is claimed is:

1. A power operated valve adapted for use in contaminated fluids comprising:
   (a) a valve body having a movable valve element therein;
   (b) an actuator rod extending through said valve body for moving said valve element;
   (c) power means mounted on said valve body for reciprocating said rod including a sealed cavity into which said actuator rod extends; and
   (d) porous means surrounding said rod at the connection between the valve body and the power means for permitting fluid communication between the interior of the valve body and said cavity while preventing the passage of solid or viscous substances, said porous means comprising a rigid disc made of porous material and having a centrally located aperture therethrough.

2. The invention of claim 1 in which said power means is a solenoid including a casing, electromagnetic coil structure mounted in said casing, a cylinder defining said cavity positioned within said coil structure, a plunger positioned within said cylinder to be reciprocated by said electromagnetic structure, and a tubular base having one end secured to and one end of said cylinder with the other end of the base being secured to said valve body;
   said rod extending through said base into said cylinder and being operatively connected to said plunger,
   said porous means being clamped between a portion of said valve body and said base.

3. The invention of claim 2 in which said base includes passage means formed therein permitting fluid flow between said valve body and said cylinder.

4. The invention of claim 3 in which said passage means includes an annular groove on the end of said base adjacent said porous means; and a passage in said base having one end opening into said groove and its other end in communication with said cylinder.

References Cited

UNITED STATES PATENTS

| 1,944,113 | 1/1934 | Shenton | 251—129 X |
| 2,371,432 | 3/1945 | DiPietro | 137—550 X |
| 2,465,036 | 3/1949 | Ray | 251—129 |
| 2,596,409 | 5/1952 | Johnson et al. | 251—129 X |
| 2,853,100 | 9/1958 | Donnelly | 137—550 X |
| 3,004,670 | 10/1961 | Zonker | 251—139 X |
| 3,286,730 | 11/1966 | Beck et al. | 137—550 |

FOREIGN PATENTS

| 491,867 | 4/1953 | Canada. |

M. CARY NELSON, *Primary Examiner.*

ROBERT C. MILLER, *Assistant Examiner.*